(12) United States Patent
Danner

(10) Patent No.: US 7,652,120 B2
(45) Date of Patent: Jan. 26, 2010

(54) MODIFIED POLYORGANOSILOXANES, AQUEOUS EMULSIONS THEREOF, THEIR PRODUCTION AND THEIR USE

(75) Inventor: Bernard Danner, Riedisheim (FR)

(73) Assignee: Clariant Finance (BVI) Limited, Tortola (VG)

(*) Notice: Subject to any disclaimer, the term of this patent is extended or adjusted under 35 U.S.C. 154(b) by 0 days.

(21) Appl. No.: 10/478,618

(22) PCT Filed: May 14, 2002

(86) PCT No.: PCT/IB02/01674

§ 371 (c)(1),
(2), (4) Date: Nov. 13, 2003

(87) PCT Pub. No.: WO02/092666

PCT Pub. Date: Nov. 21, 2002

(65) Prior Publication Data

US 2004/0236055 A1  Nov. 25, 2004

(30) Foreign Application Priority Data

May 15, 2001 (EP) .................................. 01810478

(51) Int. Cl.
*C08G 77/26* (2006.01)
(52) U.S. Cl. ......................... 528/38; 528/27; 524/838; 8/DIG. 1
(58) Field of Classification Search .................. 528/38, 528/27; 524/838; 8/DIG. 1
See application file for complete search history.

(56) References Cited

U.S. PATENT DOCUMENTS

| 4,533,714 | A | 8/1985 | Sebag et al. | |
|---|---|---|---|---|
| 4,587,321 | A | 5/1986 | Sebag et al. | |
| 4,680,366 | A | 7/1987 | Tanaka et al. | 528/27 |
| 4,833,225 | A | 5/1989 | Schaefer | |
| 4,891,166 | A | 1/1990 | Schaefer | |
| 5,025,076 | A | 6/1991 | Tanaka et al. | 528/33 |
| 5,075,403 | A | 12/1991 | Kirk | |
| 5,618,525 | A | 4/1997 | Buenning | |
| 5,725,736 | A | 3/1998 | Schroeder et al. | |
| 6,132,739 | A | 10/2000 | Leverett | |
| 6,482,969 | B1 | 11/2002 | Helmrick et al. | |
| 7,153,922 | B2 * | 12/2006 | Hohberg et al. | 528/28 |
| 2004/0138400 | A1 | 7/2004 | Lange et al. | |
| 2004/0236055 | A1 | 11/2004 | Danner | |
| 2005/0255075 | A1 | 11/2005 | Meder | |
| 2007/0041930 | A1 | 2/2007 | Meder et al. | |

FOREIGN PATENT DOCUMENTS

| DE | 198 17 776 | 10/1999 |
|---|---|---|
| DE | 100 04 321 A | 8/2001 |
| EP | 282 720 B1 | 9/1988 |
| JP | 61-194823 | 3/1988 |
| JP | 02-104398 | 1/1992 |
| JP | 09-194335 | 7/1997 |
| JP | 11-012152 | 1/1999 |
| WO | WO 00/12053 | 3/2000 |
| WO | WO 02/10259 A | 2/2002 |
| WO | WO 2005/035628 | 4/2005 |

OTHER PUBLICATIONS

Definition "polyethylene glycol", Hawley's Condensed Chemical Dictionary, 2002.*
Machine generated translation JP 09-194335 Jul. 29, 1997.*
English abstract for DE 198 17 776, Oct. 28, 1999.
English Language Abstract of DE 100 04 321 A, Aug. 09, 2001.
English Language Abstract of JP 09-194335, Jul. 29, 1997.
English Language Abstract of JP 11-012152, Jan. 19, 1999.
Co-pending U.S. Appl. No. 10/575,153, Danner, et el., filed Apr. 6, 2006.
Co-pending U.S. Appl. No. 11/487,271, Klug, et al., filed Jul. 14, 2006.
English Language Abstract of JP 02-104398, Jan. 16, 1992.
English Language Abstract of JP 61-194823, Mar. 4, 1988.

* cited by examiner

*Primary Examiner*—Margaret G Moore
(74) *Attorney, Agent, or Firm*—Tod A. Waldrop

(57) ABSTRACT

Substituted aminopolyorganosiloxanes ($S_H$) containing substituted amino groups which are bonded to silicon atoms of the polysiloxane skeleton via alkylene bridges or mono- or oligo-(alkyleneamino)alkylene bridges, in which the amino groups occurring in the aminopolyorganosiloxanes are substituted at least in part with a radical of the formula $$T-CH_2-CHOH-CH_2- \qquad (\epsilon),$$

in which T signifies the radical of a surfactant monoalcohol polyglycol ether having an emulsifier character,
in an average ratio of at least 1.5 radicals of the formula ($\epsilon$) per Si-bonded aminoalkyl group or amino-mono- or -oligo-(alkyleneamino)-alkyl group, and for the remaining part optionally are at least in part acylated to amide groups or optionally are at least in part alkylated and/or benzylated, and basic amino groups optionally are protonated,
aqueous compositions ($W_{SH}$) thereof, their production and use, particularly for the softening finishing of fibrous material, and detergent or softening agent compositions for domestic laundry comprising them.

46 Claims, No Drawings

MODIFIED POLYORGANOSILOXANES, AQUEOUS EMULSIONS THEREOF, THEIR PRODUCTION AND THEIR USE

Polysiloxanes are desirable softeners for the softening finishing of textiles owing to their typical properties, above all the soft handle quality and permanence. For application, use is usually made of aqueous liquors, and for addition to the liquors the polysiloxanes are generally formulated in the form of aqueous emulsions, expediently with the aid of suitable emulsifiers. The application can principally take place by impregnation or exhaust methods. If the application is carried out by exhaust methods by the modern high-speed methods in jet-dyeing machines, the application of the polysiloxanes from the aqueous application liquors can cause problems, since for use in jet-dyeing machines, the application liquors, due to the high speed of the goods and/or liquor or due to the high mutual speed of the goods and the liquor, are subjected to a high dynamic load, through which high and variable shear forces act on the products located in the liquor. Due to these high and also variable shear forces, the dispersed (or emulsified) constituents of the aqueous liquor may be destabilized and separate out, for example, as agglomerates, which has the consequence that the separated-out components smear the goods and machines, which then have to be cleaned laboriously. If the textile goods are smeared with separated-outpolysiloxane—which causes the feared "siloxane spots" on the goods—removal of the siloxane spots from the goods is particularly difficult if not under certain circumstances impossible. In the case of aqueous polysiloxane emulsions, products present in the liquor or on the substrate (for example surfactants, dyes, optical brighteners or/and polymeric treatment agents) may additionally exert an action on the polysiloxane emulsion which interferes to varying extents from case to case, which additionally favours its destabilization. In the case of the treatment of cross-wound bobbins or in other processes in which the liquor is forced through nozzles or through the substrate, or also in liquor circulation pumps, the liquors may also be subjected to high dynamic loads and thereby destabilized.

From U.S. Pat. No. 4,680,366 are known modified aminopolyorganosiloxanes which comprise Si-bonded amino-$C_{1-8}$-alkyl radicals or N-(2-aminoethyl)amino-$C_{1-8}$-alkyl radicals which are substituted at at least a part of the terminal amine groups with a radical of the formula

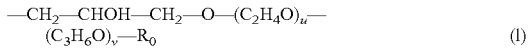
$$—CH_2—CHOH—CH_2—O—(C_2H_4O)_u—(C_3H_6O)_v—R_0 \qquad (l)$$

in which $R_0$ signifies hydrogen or a $C_{1-20}$-hydrocarbon radical, u signifies an integer not exceeding 50 and v signifies 0 or an integer not exceeding 50, so that in the molecule, beside Si-bonded radicals of formula

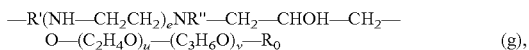
$$—R'(NH—CH_2CH_2)_eNR''—CH_2—CHOH—CH_2—O—(C_2H_4O)_u—(C_3H_6O)_v—R_0 \qquad (g),$$

in which R' signifies a bivalent hydrocarbon radical with 1 to 8 carbon atoms, e signifies 0 or 1 and R" signifies hydrogen or a monovalent $C_{1-20}$-hydrocarbon radical, there occurs also a certain proportion of Si-bonded radicals of formula

$$—R'—NH—CH_2CH_2)_eNH—R'' \qquad (h).$$

These products may be synthesized by reaction of organopolysiloxanes containing Si-bonded radicals of formula (h), with corresponding glycidyl ethers of formula

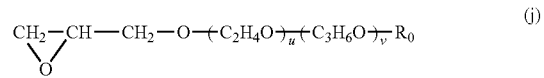
$$CH_2—CH—CH_2—O—(C_2H_4O)_u—(C_3H_6O)_v—R_0 \qquad (j)$$
$$\underset{O}{\diagdown\diagup}$$

in a ratio (j)/(h) which is smaller than equimolar. They are employed as textile finishing agents, in particular as antistatic and softening agents. For their use as softeners reference is made in U.S. Pat. No. 4,680,366 in column 4, in lines 1 to 16, in particular to the importance of the presence of the unsubstituted radicals (h). For application of the finishing agents, in this U.S. Pat. No. 4,680,366 there is described no particular application method other than in the examples in column 7, lines 36-40, where there is mentioned only a dipping and nipping method. Application processes in which the liquor is subjected to a higher dynamic stress, especially so that higher shearing forces occur, which might impair the stability and efficiency of the products, are neither described nor mentioned there; and so there is also not addressed there any problem in connection with any such high stress of the liquor.

It has now been found that the modified aminopolyorganosiloxanes defined below—which comprise the below defined radicals (ε) in a ratio substantially higher than equimolar to the Si-bonded aminoalkyl groups or amino-mono- or -oligo-(alkylamino)-alkyl groups, as defined below—represent satisfactory softeners having a broad scattering of substantivity and hydrophilicity, and whose aqueous emulsions and microemulsions are surprisingly stable to shear forces, and which are excellently suitable for application under high dynamic loading of the liquor, e.g. even in jet-dyeing machines.

The invention relates to the defined polysiloxanes ($S_H$) and aqueous compositions therefrom, to their production and to their use.

A first subject-matter of the invention are substituted aminopolyorganosiloxanes ($S_H$) containing substituted amino groups which are bonded to silicon atoms of the polysiloxane skeleton via alkylene bridges or mono- or oligo-(alkyleneamino)alkylene bridges, in which the amino groups occurring in the aminopolyorganosiloxanes are substituted at least in part with a radical of the formula

$$T—CH_2—CHOH—CH_2— \qquad (ε),$$

in which T signifies the radical of a surfactant monoalcohol polyglycol ether having an emulsifier character, in an average ratio of at least 1.5 radicals of the formula (ε) per Si-bonded aminoalkyl group or amino-mono- or -oligo-(alkyleneamino)-alkyl group, and for the remaining part optionally are at least in part acylated to amide groups or optionally are at least in part alkylated and/or benzylated, and basic amino groups optionally are protonated.

The substituted aminopolyorganosiloxanes ($S_H$) according to the invention can be produced analogously to the methods known per se, by introduction of the radicals (ε) and optionally one or more of the further substituents, into corresponding starting aminopolyorganosiloxanes (S) which contain primary and/or secondary amino groups.

The process for the production of the substituted aminopolyorganosiloxanes ($S_H$) according to the invention is, in particular, characterized in that aminopolyorganosiloxanes (S) which contain primary and/or secondary amino groups which are bonded to silicon atoms of the polysiloxane skeleton via alkylene bridges or mono- or oligo-(alkyleneamino)-alkylene bridges are reacted with at least one alcohol polyglycol ether monoglycidyl ether (H) and are optionally acylated and/or alkylated and/or benzylated and/or protonated.

The alcohol polyglycol ether monoglycidyl ethers (H) are in general glycidyl ethers of alcohol polyglycol ethers having a surfactant character, in particular having an emulsifier character, and may be represented by the following formula

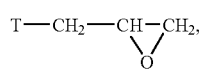 (I)

in which T signifies the radical of the corresponding surfactant alcohol polyglycol ether T-H, in particular as can be produced by glycidyl ether formation of a corresponding surfactant alcohol polyglycol ether T-H.

The surfactant alcohol polyglycol ethers T-H may be any desired corresponding surfactants, for example in which the alcohol radical originates from an araliphatic, alkylaromatic or preferably aliphatic alcohol having at least 8 carbon atoms, preferably having from 8 to 24 carbon atoms, and the polyglycol radical is a polyalkylene glycol radical in which alkylene contains from 2 to 4 carbon atoms and at least some of the alkylene glycol units are ethylene glycol units. They advantageously have a predominantly hydrophilic character and are preferably those in which the number of ethyleneoxy units on average makes up at least half of the alkyleneoxy units present in T-H. The alcohol polyglycol ethers T-H are preferably those of the following average formula

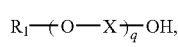 (II)

in which $R_1$ signifies a hydrocarbon radical having from 8 to 24 carbon atoms, X signifies $C_{2-4}$-alkylene and q signifies from 4 to 50, with the proviso that at least 50% of the q alkylene groups in the meaning of X signify ethylene.

The hydrocarbon radicals $R_1$ may be any desired radicals as otherwise usually occur in non-ionogenic surfactants. They are advantageously alkylaromatic or aliphatic and advantageously contain from 9 to 18, preferably from 11 to 16 carbon atoms.

If $R_1$ is alkylaromatic, $R_1O$— preferably stands for the radical of a mono- or di-alkylphenol, preferably, for example, for the radical of di-t-butylphenol, p-isooctylphenol or p-nonylphenol.

If $R_1$ is aliphatic, it is preferably saturated; in this case, $R_1O$— preferably stands for the radical of a primary, saturated, aliphatic alcohol or respectively of a primary alkanol, which advantageously contains from 9 to 18, preferably from 11 to 16 carbon atoms. The corresponding aliphatic alcohol $R_1OH$ may be, for example, a linear fatty alcohol, for example lauryl alcohol, myristyl alcohol, cetyl alcohol or stearyl alcohol, or also a synthetic alcohol (for example from the oxo synthesis or from the Ziegler synthesis), which may be linear or branched, for example nonanol, isononanol, decanol, isodecanol, undecanol, tridecanol, isotridecanol or isohexadecanol.

The number q of alkyleneoxy units adducted onto this alcohol for the formation of the alcohol polyglycol ether, in particular of the formula (II), is advantageously in the range from 4 to 30, preferably from 4 to 20. Advantageously, at least 80% of the q alkyleneoxy units are ethyleneoxy units, preferably 100% of the q alkyleneoxy units are ethyleneoxy units. The number of ethyleneoxy units in T-H is advantageously from 4 to 30, preferably from 4 to 18, particularly preferably from 5 to 12.

The surfactants T-H with emulsifier character, in particular of the formula (II), are advantageously those whose HLB is greater than 7, and is advantageously in the range from 7 to 17, preferably from 8 to 16.5, particularly preferably from 9 to 16.

For the production of the glycidyl ethers (H), in particular those of the formula (I), the alcohol polyglycol ethers T-H, in particular those of the formula (II), can be reacted with epichlorohydrin in two steps, where in the first step the hydroxy group of T-H is reacted with the epoxide group of the epichlorohydrin, so that the latter is added onto the hydroxy group of T-H with opening of the epoxide ring and forming the corresponding chlorohydrin, and in the second step the resultant chlorohydrin is dehydrochlorinated and the epoxide ring of the glycidyl radical is thus closed. This reaction can be carried out in an analogous manner to known glycidyl ether formations, preferably in the absence of solvents. The first step is advantageously carried out at temperatures below 130° C., preferably in the range from 50 to 120° C., particularly preferably from 60 to 110° C., advantageously in the presence of a suitable ring-opening catalyst, for example tin tetrachloride or boron trifluoride etherate. The second step advantageously takes place under an inert atmosphere (preferably under reduced pressure in order to remove the water of reaction), and at a mild temperature, for example in the range from 20 to 100° C., preferably from 25 to 90° C. The reaction components T-H and epichlorohydrin are advantageously employed in a stoichiometric or nearly stoichiometric quantitative ratio. For every mole of alcohol polyalkylene glycol ether T-H there may be employed for example, 1 mol of epichlorohydrin ±10%, preferably 1 mol of epichlorohydrin ±5%.

By this reaction, the monoglycidyl ether (H) can be produced in high yield, which can be determined by titration of the epoxide groups and determination of the epoxide equivalent. One epoxide equivalent is the amount of product which reacts with 1 mol of hydrogen bromide in the titration with perchloric acid and tetramethylammonium bromide. The yield of monoglycidyl ether, in particular of compound of the formula

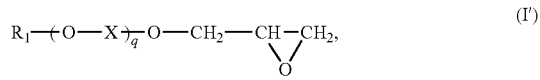 (I')

is, for example, above 70 mol-%, preferably above 75 mol-%.

By-products which may occur are above all compounds in which two or more mol of epichlorohydrin have reacted successively with 1 mol of alcohol polyglycol ether T-H (i.e., for example, chloromethyl-substituted epoxides), furthermore also correspondingly unreacted alcohol polyglycol ethers T-H, and optionally, in small amounts, glycidols. With respect to the production of the modified polysiloxanes of the invention, separation is not necessary, and it is possible to employ as (H) products whose epoxide equivalent weight is, for example, in the range from 100 to 150%, preferably from 100 to 130%, based on the simple monoglycidyl ether, particularly of the formula (I) or (I').

The primary and/or secondary amino groups in the aminopolysiloxanes (S) to be reacted with (H) are, in particular, part of the Si-bonded aminoalkyl groups or amino-mono- or -oligo-(alkyleneamino)-alkyl groups and may be those as usually occur in aminopolysiloxanes which have otherwise not been further modified, and may be formed through the use of corresponding monomers in the production of the respective aminopolysiloxanes. Their alkyl and alkylene groups are advantageously those having from 2 to 4 carbon atoms and may be linear or, if they contain 3 or 4 carbon atoms, also branched. The Si-bonded aminoalkyl groups preferably contain 3 or 4 carbon atoms in the alkyl radical; the alkylene groups connecting two amino groups preferably contain 2 or 3 carbon atoms. The primary amino groups and any secondary amino groups optionally present in (S) are principally constituents of aminoalkyl groups or amino-mono- or -oligo-(alkyleneamino)-alkyl groups of the formula

  (α)

in which $Y_1$ signifies 1,2- or 1,3-propylene or 2-methyl-1,3-propylene, $Y_2$ signifies ethylene or propylene and p signifies 0, 1 or 2, which are bonded to silicon atoms of the polysiloxane skeleton.

$Y_1$ advantageously stands for 2-methyl-1,3-propylene or preferably 1,3-propylene; $Y_2$ in particular stands for 1,2- or 1,3-propylene or preferably ethylene; p advantageously stands for 0 or 1, preferably 1.

The radicals of the formula (a) are preferably those of the formula

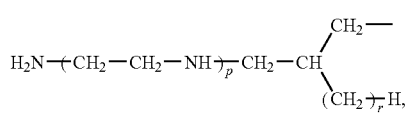  (α')

in which r signifies 0 or 1, particularly preferably of the formula

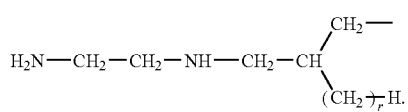  (α'')

The index r particularly preferably stands for 0.

By the reaction with (H), the respective radicals (ε) or

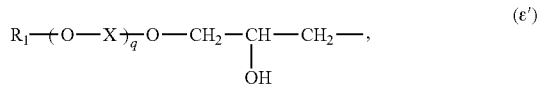  (ε')

are introduced into the aminoalkyl groups or amino-mono- or -oligo-(alkyleneamino)-alkyl groups, in particular into those of the formula (α). The primary amino group reacts with priority, so that a first radical (ε) or respectively (ε') replaces a hydrogen atom of the primary amino group, and further radicals (ε) or respectively (ε') replace in a random distribution hydrogen atoms of the secondary amino groups present. If desired, still acylatable amino groups may be acylated and/or alkylatable amino groups present may be alkylated or/and benzylated.

By the acylation, low-molecular-weight acyl radicals are preferably introduced, advantageously those having from 2 to 4 carbon atoms, for example acetyl, propionyl or butyryl, of which acetyl is particularly preferred. By the alkylation or benzylation, low-molecular-weight alkyl radicals or benzyl radicals may likewise preferably be introduced, advantageously alkyl radicals having 1-4 carbon atoms, preferably ethyl or methyl, or benzyl radicals.

For the acylation, there may be employed acylating agents known per se, as conventionally employed per se for the acylation of amino groups, for example acid chlorides or anhydrides of aliphatic $C_{2-4}$-monocarboxylic acids, or also ($C_{1-4}$-alkyl) percarbonates or di($C_{1-4}$-alkyl) oxalates. The acylation can take place under conditions which are conventional per se. The acylation with an acid anhydride or chloride can take place, for example, by simple mixing of the reaction components, optionally in the presence of water or/and an organic solvent, under mild temperature conditions, for example at temperatures in the range from 10 to 40° C., most simply at room temperature. If an acid anhydride or chloride is used for the amine acylation, the corresponding protonated form of any basic amino group still present in the molecule may simultaneously be formed.

For the alkylation or benzylation, use can be made of alkylating or respectively benzylating agents which are known per se and are known to be employable per se for the alkylation or benzylation of primary, secondary or also tertiary amino groups, for example alkyl halides or dialkyl sulfates, for example dimethyl sulfate, diethyl sulfate or methyl or ethyl chloride or bromide, or benzyl chloride. If the quaternary ammonium form is to be produced, it is advantageous to use benzyl chloride or preferably a dialkyl sulfate for this purpose. The corresponding counterion (particularly chloride or alkylsulfate ion) to the respective quaternary ammonium ion formed is formed in the process.

This reaction can be carried out in an analogous manner to known alkylations or benzylations, for example in water or in the presence of organic solvents, advantageously at temperatures below 130° C., preferably in the range from 30 to 120° C., particularly preferably from 40 to 100° C.

The replaceable hydrogen atoms of the basic amino groups can be determined in a manner known per se by titration, and the degree of reaction of (S) with (H) is advantageously based on the total titrated amino hydrogen of (S).

The reaction of (S) with (H) is advantageously carried out in such a way that practically all primary amino groups of (S) are reacted with (H) in such a way that they are at least mono-substituted and at least sufficient hydrogen atoms of the secondary hydrogen atoms remaining are replaced by a radical (ε) that the requisite degree of substitution of on average at least 1.5, advantageously at least 1.8, preferably at least 2 radicals of the formula (ε) per Si-bonded amino-alkyl group or amino-mono- or -oligo-(alkyleneamino)-alkyl group is reached. The proportion of secondary amino groups which are reacted with (H) can vary depending on the number of secondary amino groups in this Si-bonded group, in particular depending on the meaning of p in the radical of the formula (α) or (α'). In the case of p=0, this proportion is, in particular, at least half, or from 50 to 100%, of the secondary amino groups, advantageously from 80 to 100%, preferably from 95 to 100% thereof; in the case where p=1, at least ¼, in particular from 25 to 100%, of the secondary amino groups, advantageously from 50 to 100%, preferably from 80 to 100% thereof; in the case where p=2, at least ⅙, in particular from 16.7 to 100%, of the secondary amino groups, advantageously from 40 to 100%, preferably from 60 to 100% thereof.

The reaction of (S) with (H) can, for example in the case where p≧1, advantageously be carried out to a degree of substitution in the range from 40 to 100%, preferably from 45 to 100%, particularly from 50 to 100%, or in the case where p=0 advantageously to a degree of substitution in the range from 75 to 100%, preferably from 80 to 100%, particularly from 90 to 100% [based on the reactive hydrogen atoms of the basic amino groups in (S)].

After the reaction of (S) with (H) at least some (for example from 5 to 100%, in particular from 10 to 90%) of the residual, non-reacted reactive hydrogen atoms (if any) of the basic amino groups may optionally be replaced by acyl radicals of aliphatic monocarboxylic acids, preferably those having 2-4 carbon atoms, by means of acylation acylation or may be replaced by methyl or ethyl or benzyl by means of alkylation or benzylation respectively. The alkylation and/or benzylation can, depending on the available amino groups present and alkylating or benzylating agents employed, optionally lead to corresponding secondary or tertiary amino groups or even to the quaternary ammonium stage. Basic amino groups which are not quaternized may optionally be protonated.

After the reaction of (α) with (H) the amino groups optionally present which can still be alkylated are most simply neither further alkylated nor further benzylated, in particular also not quaternized, while it is advantageous, according to an aspect of the invention, to acylate at least some of the acylatable amino groups. According to a further advantageous embodiment of the invention any protonatable amino groups present are protonated at least in part.

The preferred groups deriving, as mentioned above, from the Si-bonded aminoalkyl groups or amino-mono- or -oligo-(alkyleneamino)-alkyl groups, in particular from the Si-bonded groups (α) by reaction with (H) and optionally acylation and/or optionally further alkylation and/or benzylation, can be represented by the following average formula

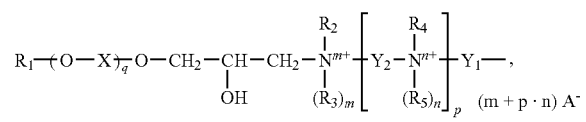

(β)

in which m signifies 0 or 1,
n signifies from 0 to 1, $R_2$ signifies hydrogen, $C_{1-2}$-alkyl, benzyl, or a radical of the formula (ε') or, if m=0, also a radical of the formula $R_6$—CO—, $R_3$ signifies hydrogen or, if $R_2$ stands for $C_{1-2}$-alkyl, benzyl or a radical of the formula (ε'), also $C_{1-2}$-alkyl or benzyl, $R_4$ signifies hydrogen, $C_{1-2}$-alkyl, benzyl, a radical of the formula (ε') or, if n=0, also a radical of the formula $R_6$—CO—, $R_5$ signifies hydrogen or, if $R_4$ stands for $C_{1-2}$-alkyl, benzyl or a radical of the formula (ε'), also $C_{1-2}$-alkyl or benzyl, $R_6$ signifies $C_{1-3}$-alkyl and $A^-$ signifies a monovalent anion, with the provisos that at least 50% of the q alkylene groups in the meaning of X signify ethylene and the radicals of the formula (β) contain on average at least 1.5 radicals of the formula (ε') per radical of the formula (β).

Preferred groups of formula (β) derived from the groups of the formula (α') or (α") can be represented by the following average formulae

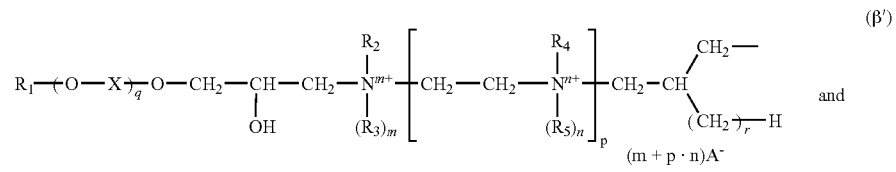

(β')

and

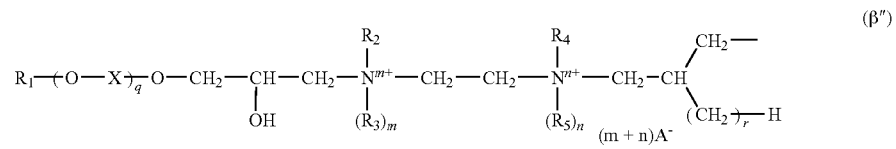

(β")

in which preferably at least one of $R_2$ and $R_4$ also stands for a radical of the formula (ε').

Of these, preference is also given to the non-quaternized compounds, particularly those of the formula

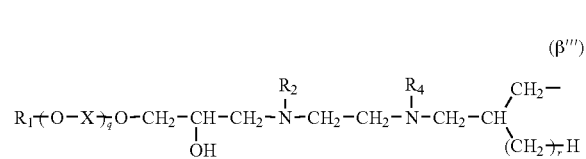

(β''')

and their protonated derivatives.

The substituted derivatives produced from the Si-bonded aminoalkyl groups or amino-mono- or -oligo-(alkyleneamino)-alkyl groups, in particular of the formula (ca), by the above-described reaction, in particular of the formula (β'), contain the respective substituents in a distribution corresponding to the production. Thus, the preferred groups (β") originating from the radicals of the formula (α") may principally be represented by the following formulae:

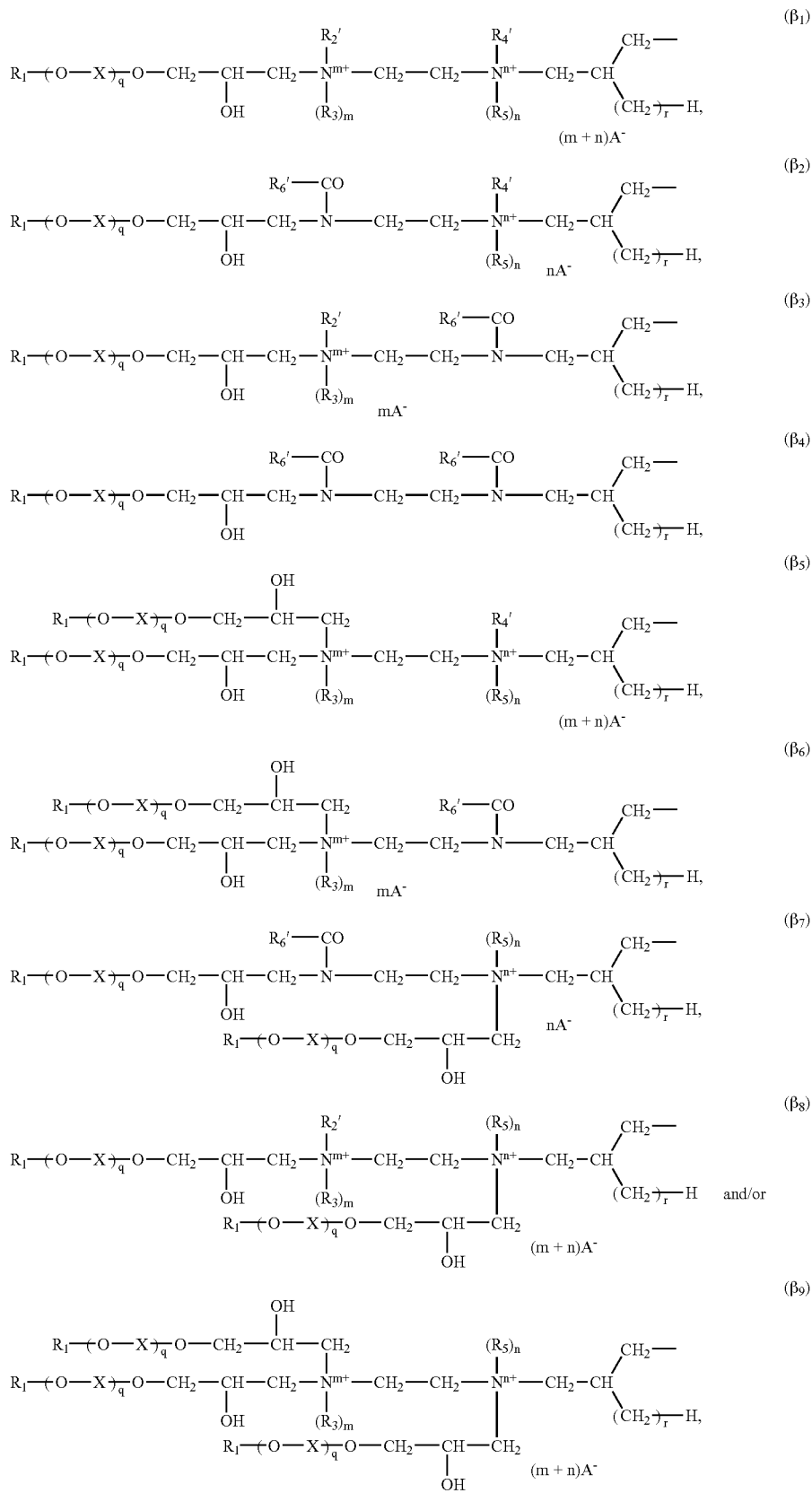

in which $R_2'$ signifies hydrogen, methyl, ethyl or benzyl, $R_4'$ signifies hydrogen, methyl, ethyl or benzyl and $R_6'$ signifies methyl or ethyl.

In those which have been reacted exhaustively or nearly exhaustively with (H), those containing (p+2) radicals of the formula ($\epsilon$), preferably ($\epsilon'$), preponderate correspondingly, i.e. among those of the above formulae ($\beta_1$) to ($\beta_9$), those of the formula ($\beta_9$), and may be accompanied by correspondingly smaller proportions of those which are less highly substituted by ($\epsilon$) or ($\epsilon'$), especially those of the formulae ($\beta_5$) and/or ($\beta_8$).

In those which have been reacted with (H) to a lower degree of reaction, for example in those in which from 50 to 75% of the replaceable nitrogen-bonded hydrogen atoms of ($\alpha$), particularly in which p signifies 1 or 2, preferably of ($\alpha'$) or ($\alpha''$), have been replaced by radicals of the formula ($\epsilon$) or ($\epsilon'$) and the others have optionally been acylated and/or alkylated and/or benzylated, those containing from 2 to (p+1) radicals of the formula ($\epsilon$), preferably ($\epsilon'$), correspondingly preponderate; among those of the above formulae ($\beta_1$) to ($\beta_9$) thus preponderate those of the formulae ($\beta_5$), ($\beta_6$), ($\beta_7$) and/or ($\beta_8$), any of ($\beta_9$) and/or ($\beta_1$), ($\beta_2$), ($\beta_3$) and/or ($\beta_4$) being then present in minor proportions.

Those originating from Si-bonded aminoalkyl radicals, particularly from the radicals of the formula

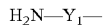 ($\alpha'''$)

in particular

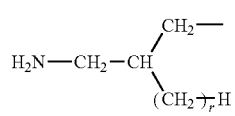 ($\alpha''''$)

are advantageously reacted with (H) to exhaustion or nearly to exhaustion, so that those disubstituted with radicals ($\epsilon$) or ($\epsilon'$) preponderate, or in the preferred ones originating from ($\alpha''''$), mainly the radicals of the formula

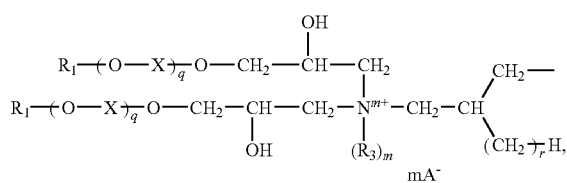 ($\beta_{10}$)

preponderate, and in the product correspondingly minor proportions of those which are monosubstituted with radicals of the formula ($\epsilon$) or ($\epsilon'$) may optionally occur, in particular, in the preferred ones originating from ($\alpha''''$), principally the radicals of the formula

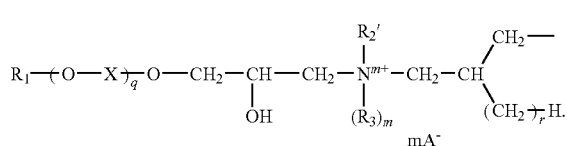 ($\beta_{11}$)

As starting polysiloxanes (S) are suitable any desired amino-substituted polysiloxanes which contain corresponding Si-bonded aminoalkyl groups or amino-mono- or -oligo-(alkyleneamino)-alkyl groups. Suitable in general are any desired corresponding aminopolysiloxanes having a polycationic or respectively polybasic character, essentially those which have been built up from recurring dimethylsiloxy units and aminosiloxy units. They may have a linear constitution or also a branched and/or crosslinked constitution (for example mono- or poly-branched or -crosslinked). The end groups may contain a reactive substituent, in particular, for example, hydroxy or alkoxy, or may optionally also be blocked; for example with trimethylsiloxy. According to a further variant, the end groups may also contain the above-mentioned aminoalkyl groups or amino-mono- or -oligo-(alkyleneamino)-alkyl groups.

The aminopolysiloxanes (S) are preferably built up from recurring units of the following formulae:

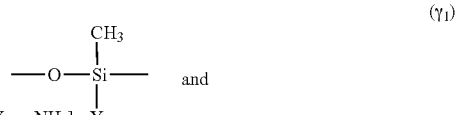 ($\gamma_1$)

 ($\gamma_2$)

The end groups preferably conform to the formulae:

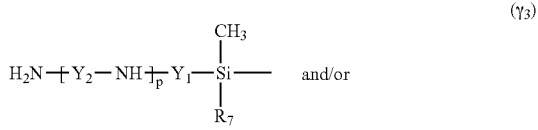 ($\gamma_3$)

 ($\gamma_4$)

in which $R_7$ signifies methyl, hydroxy, methoxy or ethoxy.

Optionally (S) may also contain Si-branched units of the formula

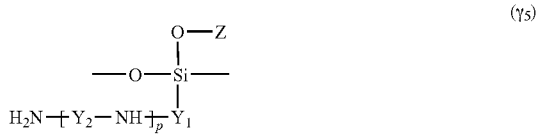 ($\gamma_5$)

in which Z signifies an Si-bonded (poly)siloxane or silyl radical which contains one or more of the groups of the formula ($\gamma_1$), ($\gamma_2$), ($\gamma_3$) and/or ($\gamma_4$) and optionally further Si-branches or crosslinkings of this type (for example mono- or polybranched or/and -crosslinked).

The aminopolyorganosiloxanes (S) may be characterized by typical parameters which are customary per se, for example by their average molecular weight and the content of amine nitrogen, and also by their viscosity. The average molecular weight and the content of amine nitrogen of the aminopolyorganosiloxanes (S) can vary in broad ranges, aminopolyorganosiloxanes (S) with a low amine number being principally suitable for the purpose of the invention, particularly those with an amine number of $\leq 3$.

The aminopolysiloxanes (S) advantageously have a viscosity in the range 500-30,000, principally 200-20,000, preferably 300-3000 cP (Brookfield rotational viscometer RV, spindle No. 5, 20° C.). The amine number of (S) is advantageously in the range from 0.05 to 3, preferably from 0.1 to 2, particularly preferably from 0.15 to 1. The average molecular weight $\overline{M}_w$ of (S) is e.g. in the range of 1500 to 300,000, advantageously in the range from 1500 to 150,000, preferably from 2000 to 100,000, more preferably from 4000 to 40,000.

The aminopolysiloxanes (S) consisting of the above-mentioned units may be represented schematically, in particular, by the following average comprehensive formula:

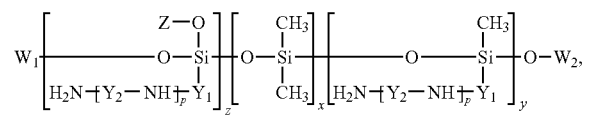

(III)

in which $W_1$ and $W_2$ each signify a group of the formula $(\gamma_3)$ or $(\gamma_4)$, the molecule possesses at least one group of the formula ($\alpha$) or respectively $(\gamma_1)$, $(\gamma_3)$ and/or $(\gamma_5)$, and the indices x, y and z are selected in such a way that the polymer has the above-indicated values for amine number, viscosity and molecular weight. [The above formula (III) merely serves for illustration of the monomer units occurring and their number, but not their distribution or position in the polymer molecule.] The ratio of the number of dimethylsiloxy units to the number of aminoalkylsiloxy units and/or amino-mono- or -oligo-(alkyleneamino)-alkylsiloxy units, in particular of the formula

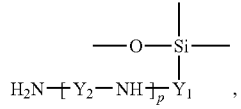

$(\gamma_6)$ is advantageously in the range from 3/1 to 600/1, preferably from 10/1 to 200/1.

The polysiloxanes (S) may be produced in a manner known per se or analogously to known methods, for example by aminoalkylation of polysiloxanes containing reactive Si-bonded hydrogen atoms, or principally by copolymerization of amino-containing silanes with corresponding nonionogenic silanes or polysiloxanes or cyclic siloxanes.

The aminoalkylation can take place under conditions known per se, using conventional aminoalkylating agents or respectively hydrosilylating agents, for example with allylamine.

For the copolymerization, the amino-containing silanes are preferably copolymerized with α,ω-dihydroxypolydimethylsiloxane, advantageously having an average molecular weight $\overline{M}_w$ in the range from 500 to 10,000, preferably from 1000 to 7000, or with cyclic siloxanes, for example hexamethylcyclotrisiloxane, octamethylcyclotetrasiloxane, decamethylcyclopentasiloxane, dodecamethylcyclohexasiloxane and technical-grade mixtures of two or more thereof. Suitable silanes include principally trimethoxy- or -ethoxysilanes or dimethoxy- or -ethoxymethylsilanes which are aminoalkyl-substituted or amino-mono- or -oligo-(alkyleneamino)-alkyl-substituted on Si, in which the Si-bonded aminoalkyl group or amino-mono- or -oligo-(alkyleneamino)-alkyl group advantageously conforms to the formula ($\alpha$), preferably ($\alpha'$), particularly ($\alpha''$).

The copolymerization can be carried out in a manner known per se, principally by reaction of the reactants at moderate or elevated temperature, optionally under reduced pressure, in particular at temperatures in the range 15-180° C., optionally in the presence of a catalyst and if desired with use of end-blocking groups, for example with hexamethyldisiloxane. As catalysts, use can be made of acids (in particular formic acid, acetic acid, sulphuric acid, acidic ion exchangers or trifluoromethanesulphonic acid) or of alkali metal or ammonium compounds, for example alkali metal or ammonium silanolates (for example potassium silanolate or tetramethylammonium silanolate) or alkali metal hydroxides or ammonium hydroxides, which form the corresponding silanolates in situ with the respective silanes, or else alkali metal hydroxides, carbonates or bicarbonates (for example potassium hydroxide, sodium hydroxide or sodium bicarbonate) or further benzyltrimethylammonium hydroxide or tetrabutylammonium hydroxide. If desired, the polymerization can be carried out in the presence of an inert solvent, which can then be removed, for example by distillation, under polymerization conditions or subsequently.

If an amino-containing trimethoxysilane is used to introduce the units of the formula $(\gamma_1)$, the methoxy group can be hydrolysed to the hydroxy group or branching of the copolymer, as shown by means of the formula $(\gamma_5)$, can take place at this point, depending on the reaction conditions.

Depending on the production conditions selected, the amino-group-containing units in the molecule—for example in the molecule of the formula (III)—may be randomly distributed or may be terminal or may be grouped as in block polymers or may also accumulate towards the extremities of the linear chains.

For the production of the modified polysiloxanes $(S_H)$ of the invention, preference is given to those polysiloxanes (S) which possess an optionally branched, preponderantly linear constitution of the polysiloxane skeleton in which the units of the formula $(\gamma_2)$ preponderate besides units of the formula $(\gamma_1)$.

In accordance with the invention, polysiloxanes are produced in which the Si-bonded aminoalkyl groups or amino-mono- or -oligo-(alkyleneamino)-alkyl groups present, in particular the groups of the formula ($\alpha$) or ($\alpha'$) or ($\alpha''$), are correspondingly substituted on nitrogen by introduction of the radicals ($\epsilon$) or ($\epsilon'$) and optionally further substituents, as described above, in particular to give groups of the formula ($\beta$) or ($\beta'$) as described above. The polysiloxanes produced in this way contain, in particular, recurring units of the formulae

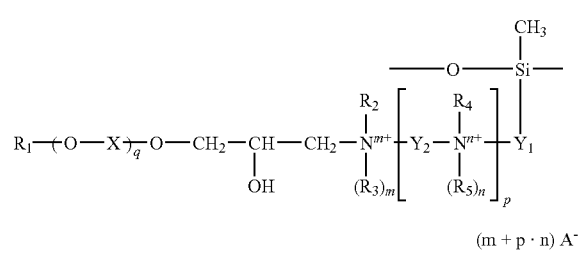

$(\gamma_7)$ and $(\gamma_2)$, and terminal, oxygen-bonded silyl groups of the formula $(\gamma_4)$ and/or

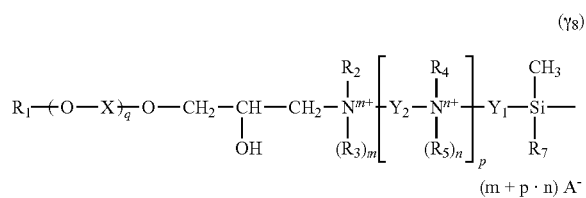

(γ₈)

and, if the starting polysiloxanes (S) contained branches, in particular as in the formula (γ₅), also correspondingly branched groups, in particular those of the formula

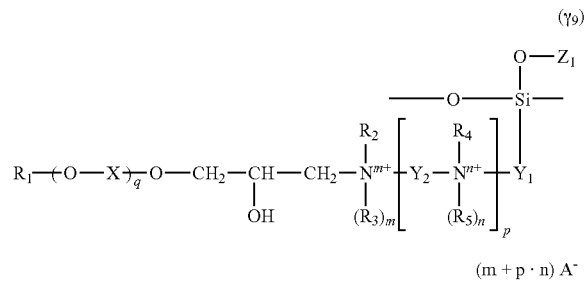

(γ₉)

in which $Z_1$ signifies an Si-bonded (poly)siloxane or silyl radical which contains one or more of the groups of the formula (γ₂), (γ₄), (γ₇) and/or (γ₈) and optionally further Si branchings of this type, with the proviso that on average at least 1.5, advantageously at least 1.8, preferably at least two radicals of the formula (ε') are present in the molecule per each of the Si-bonded aminoalkyl or/and amino-mono- or -oligo-(alkyleneamino)-alkyl groups of formula (β) present in total.

If m and/or n in the radicals of the formula (β) in the polysiloxanes produced in this way are at least in part equal to zero and the corresponding substituent $R_2$ or $R_4$ does not stand for an acyl radical $R_6$—CO—, these radicals or respectively the polysiloxanes may, if desired, be protonated. The protonation can be carried out using acids known per se, for example mineral acids, mono-$C_{1-2}$-alkyl sulfates and/or low-molecular-weight organic carboxylic acids. A mineral acid which may be mentioned is, for example, hydrochloric acid; low-molecular-weight organic carboxylic acids which come into consideration are principally aliphatic, preferably saturated $C_{1-4}$-carboxylic acids, for example formic acid, acetic acid, propionic acid, lactic acid and citric acid. Of the said acids, preference is given above all to hydrochloric acid and acetic acid.

The average molecular weight of the substituted aminopolyorganosiloxanes ($S_H$) of the invention, in particular produced as described above, may vary in a broad range, for example in the range from 1500 to 500,000, advantageously from 3000 to 200,000, preferably from 5000 to 100,000, for example depending on the selected starting materials, quantitative ratios of the reagents and reaction conditions, in particular polymerization and substitution conditions. The nitrogen content of ($S_H$)—in particular originating from the amino groups in (S) by reaction with (H) and optionally further substitution to give substituted amino and/or ammonium groups and optionally amide groups and also comprising any optional, remaining unreacted amino groups—is preferably low and is advantageously in the range from 0.03 to 4.2% by weight, preferably from 0.1 to 2.8% by weight, more preferably from 0.16 to 1.4% by weight.

The polysiloxanes ($S_H$) of the invention, in particular produced as described above, have a distinct, more or less pronounced hydrophilicity and can be diluted with water to give aqueous compositions ($W_{SH}$) If desired, emulsifiers (E) can also be added for this purpose.

Suitable emulsifiers (E) are generally any desired emulsifiers which emulsify polysiloxanes, principally non-ionogenic, preferably O/W (oil-in-water) emulsifiers (the oil "O" in this case stands for silicone oil), more preferably hydrophilic O/W emulsifiers. The emulsifiers (E) are advantageously those as described above for T-H, preferably those of the general average formula (II), in particular as defined above and preferably also as preferred above.

The emulsifiers (E) can be employed in any desired suitable quantitative ratios to the modified polysiloxanes ($S_H$), as are suitable or preferred for the respective desired purpose. Suitable weight ratios (E)/($S_H$) are, for example, in the range from 1/100 to 50/100, preferably from 2/100 to 20/100.

If desired, formulation additives (F) can be added. There may be employed formulation additives (F) as are suitable for maintaining the physical form of the formulation and/or for achieving a suitable quality of the liquid formulation, for example with a view to the intended use and/or the type of the envisaged packaging and storage and/or to the envisaged transport means for supply.

Formulation additives (F) which come into consideration are principally the following:

($F_1$) agents for influencing the liquid form of the aqueous composition, ($F_2$) agents for protection against the damaging action of microorganisms and/or ($F_3$) acids and/or bases for pH adjustment.

Auxiliaries which come into consideration ($F_1$) are essentially those which are suitable for influencing the colloidal form and/or the flow behaviour of the aqueous compositions ($W_{SH}$), in particular ($F_1'$) hydrotropes and ($F_1''$) rheology assistants.

Hydrotropes ($F_1'$) which can be mentioned are compounds which are conventional per se, for example urea, $C_{2-6}$-alkanediols (for example hexylene glycol, butanediol, propylene glycol) or di-($C_{2-4}$-alkylene) glycols (for example dipropylene glycol), their monoethers of low-molecular-weight aliphatic alcohols, for example of $C_{1-4}$-alkanols (for example butyl glycol, i.e. ethylene glycol monobutyl ether) and oligoethylene glycols (for example having an average molecular weight in the range from 200 to 400). They can be employed in concentrations conventional per se, for example in the range from 1 to 50% by weight, principally from 2 to 25% by weight, based on ($S_H$).

The term rheology assistants ($F_1''$) here is generally taken to mean auxiliaries which are suitable for influencing, in particular reducing or setting to certain values, the viscosity of the aqueous composition, above all water-soluble salts (having a water solubility of, for example, at least 3% by weight at RT), advantageously alkali metal salts of organic or inorganic acids, for example sodium acetate, chloride or cumenesulfonate. They may be employed in very low concentrations, for example in the range from 0.005 to 1% by weight, principally from 0.01 to 0.5% by weight, preferably from 0.025 to 0.25% by weight, based on ($S_H$).

Agents ($F_2$) for protection against the damaging action of microorganisms which come into consideration are principally agents for inhibiting the growth of harmful bacteria or other microbes, or also microbicides, above all fungicides. They can be employed in very small amounts. Suitable products are generally those as are commercially available, and they can also be employed in the corresponding recommended concentrations, for example in concentrations in the range from 0.001 to 0.5% by weight, preferably from 0.04 to 0.1% by weight of active substance, based on the aqueous composition ($W_{SH}$).

As additives ($F_3$) there may be employed known acids (for example as described above for protonation) or bases (for example alkali metal hydroxides or ammonium hydroxide), as needed, as may be necessary in order to set the desired pH aimed at in each case for the composition ($W_{SH}$).

As mentioned above, the polysiloxanes ($S_H$) of the invention can be diluted with water to give aqueous compositions ($W_{SH}$). If desired, at least one emulsifier (E)—as mentioned above—may also be added for this purpose. Through the addition of further formulation additives, particularly ($F_1$) and/or ($F_3$), the physical character of the aqueous compositions ($W_{SH}$) can additionally be influenced. Since the polysiloxanes ($S_H$)—even if they originate from polysiloxanes (S) having a very low amine number—display a distinct hydrophilicity, they can, even without the aid of an emulsifier or formulation additive, be formulated with water to give a colloidal, aqueous composition, in particular to give an incoherent, aqueous, colloidal system. These compositions have the character of optionally colloidal solutions or also of aqueous emulsions, in particular O/W emulsions, which may be for example macroemulsions or even very fine emulsions (i.e. in which the emulsified particles are of a very fine size) and in particular may have the appearance of a microemulsion or even nanoemulsion. Through the use of emulsifiers (E) and, if desired, formulation additives ($F_1$) and/or ($F_3$), the fineness and the viscosity of the emulsion can additionally be influenced, in particular up to the range of nanoemulsions and colloidal solutions. Microemulsions are regarded as being, in particular, those having a particle size of the emulsified particles of $\leq 0.2$ µm, and nanoemulsions are regarded as being those having a particle size of the emulsified particles of $\leq 0.04$ µm.

The aqueous compositions ($W_{SH}$) can be produced in a very simple manner, by simple mixing of ($S_H$) with water and optionally further components (E) and/or (F), where the mixing of the components can take place at any desired suitable temperatures, for example in the range from 15° C. to the reflux temperature, advantageously in the range from 18 to 80° C.; temperatures of <50° C. are particularly suitable for this purpose. The mixing is carried out most simply at room temperature.

The concentration of ($S_H$) in ($W_{SH}$) can be as desired, depending also on the solubility or hydrophilicity of ($S_H$), and optionally on the presence of (E) and/or ($F_1$) and/or ($F_3$), and/or as desired for a given application. With the modified polysiloxanes ($S_H$), dilute to highly concentrated compositions ($W_{SH}$) can be produced, for example having an ($S_H$) concentration in the range from 10 to 98% by weight, advantageously from 15 to 95% by weight [dilute compositions are regarded here as being, in particular, those having an ($S_H$) concentration of <50% by weight, principally in the range from 10 to 40% by weight, and highly concentrated compositions are regarded as being those having an ($S_H$) concentration of $\geq 50$% by weight, principally in the range from 60 to 98% by weight]. The pH of the aqueous compositions ($W_{SH}$) can vary in a broad range, for example in the pH range from 4 to 10, advantageously from 4 to 9, where the pH of the highly concentrated compositions is advantageously in the weakly acidic to basic range, preferably in the pH range from 6 to 10, while the pH of the more dilute compositions, in particular those having an ($S_H$) concentration of $\leq 40$% by weight, is advantageously in the acidic to neutral range, preferably in the pH range from 4 to 7.

According to the invention there may be produced compositions ($W_{SH}$) in a very broad range of particle size, concentration and viscosity, especially aqueous, flowable macro-, micro- or nanoemulsions, in particular also transparent to water-clear nanoemulsions—also highly concentrated ones, having an ($S_H$) content of $\geq 50$% by weight, for example 60-98% by weight.

The polysiloxanes ($S_H$) modified in accordance with the invention, in particular in the form of the defined aqueous compositions ($W_{SH}$), can be transported, stored and handled in the same form as they have been produced. They are suitable as finishing agents, in particular as softeners having hydrophilic properties, for fibrous material, in particular for textile material, and can be employed directly, in the same form as they have been formulated, for the a formulation of the application liquors or may before application from aqueous medium, be diluted with water, as required, to give more dilute stock emulsions or solutions, for example to a dry substance content of from 2 to 10% by weight.

Suitable substrates for the finishing of the invention with ($S_H$) or ($W_{SH}$) are any desired fibrous material, particularly textile material, as occurs in the textile industry, namely natural or also synthetic or semisynthetic materials and blends thereof, in particular material containing natural, modified or regenerated cellulose [principally cotton ("CO") or viscose], natural or synthetic polyamide [principally wool ("WO") or fully synthetic polyamides ("PA")], polyester ("PES"), polyurethane ("PU") or polyacrylonitrile ("PAN"), and blends thereof (for example PES/CO, PES/WO, PA/PU and PAN/CO), for example also elastane. The material can be in any desired processing form, for example as loose fibres, filaments, threads, yarn strands and bobbins, woven fabrics, knitted fabrics (particularly tricot), bonded or non-bonded nonwovens, felts, carpets, velvet, terry cloth or tufted fabrics or also ready-made or half-ready-made goods. The finish is preferably applied to cross-wound bobbins ("cheeses"), textile webs, textile tubular goods (in particular knitted tubular goods) or piece goods.

The finishing is advantageously carried out from aqueous, distinctly acidic to nearly neutral medium, in particular in the pH range 4.0-8.5. The concentration of the compositions of the invention, based on the substrate, can vary in broad limits depending on the type and nature of the substrate and the desired effect and is—calculated on component ($S_H$)—advantageously at values in the range from 0.02 to 3, preferably from 0.05 to 1% by weight of polysiloxane ($S_H$), based on the dry weight of the substrate.

The finishing process of the invention is advantageously carried out as the final finishing step of the material, preferably after bleaching, an optical brightening process and/or a dyeing process, if desired together with an additional treatment, for example permanent finishing (synthetic resin finishing) of the fibre material. The finishing can be carried out by any desired processes which are conventional per se, for example by impregnation methods or by exhaust methods. In exhaust methods, methods from long liquor and also from short liquor are suitable, for example at liquor:goods ratios in the range from 100:1 to 0.5:1, in particular between 60:1 and 2:1; the application temperature can also be at the usual values, for example in the range between room temperature and 60° C., preferably in the range from 25° C. to 50° C., and the pH is preferably in the range from 5 to 8.5. The impregnation can likewise be carried out by methods which are conventional per se, for example by dipping, padding, foam application or spraying, preferably at temperatures of 15-40°

C. and at pH values in the range from 4 to 8. After impregnation or after application by an exhaust method, the treated goods can be dried in a conventional manner, for example at from 30 to 190° C., preferably from 60 to 170° C.

The aqueous compositions ($W_{SH}$), in particular produced as described above, are distinguished by their stability, particularly storage and transport stability, and can rapidly be diluted to any desired extent with water. The aqueous compositions ($W_{SH}$) according to the invention, both in dissolved form and in emulsified form, in concentrated or also dilute form, and the liquors produced therefrom are particularly distinguished by their excellent shear force stability, and the application liquors are, in particular, stable and have an unchanged action even under strong dynamic loading of liquor and/or textile material. They are consequently particularly suitable for use in fast-running machines, for example for finishing in the winch beck, in the jigger, in yarn dyeing machines, in garment dyeing machines, but in particular in jet dyeing machines, including in those in which extremely high shear forces act (both in the liquor circulation in the dyeing machine and also in the liquor circulation pumps). They are also very suitable for the finishing of fabrics on the beaming machine and of cross-wound bobbins ("cheeses"); in this case too, the strong dynamic loading of the liquor, which is forced from the interior of the beam or cheese to the outside or vice versa through the fabric wound on the beam or through the threads of cheese, has practically no adverse effect on the compositions of the invention and on the finishing achieved therewith. Furthermore, they are also particularly suitable for impregnation processes in which high shear forces act, for example for spraying-on, if desired in the form of foam (in which the liquor is forced through spray nozzles in order to spray it onto the goods) or for vacuum impregnation processes (in which the goods sprayed with the treatment liquor are fed over at least one vacuum sieve so that the excess liquor is removed vigorously and rapidly by suction and fed back to the impregnation using a circulation pump).

The compositions of the invention are also stable in the treatment liquors to any occasional impurities which may originate, for example, as residues from a prior treatment of the substrate, in particular containing in the aqueous liquors possible dye, brightener and/or auxiliary residues, in particular they are stable to anionic, cationic or nonionic impurities, for example to dyes, optical brighteners and further treatment agents (for example fixing agents, washing agents, dyeing assistants or surfactants) and can be employed for the finishing of any dyed and/or optically brightened goods without undesired precipitation or other irreversible destabilization having to be feared.

According to a particular embodiment of the invention, the polysiloxanes ($S_H$) of the invention, optionally in the form of an aqueous composition ($W_{SH}$), can be employed for the softening finishing of washable fabrics, in particular under conditions leading to a non-permanent finishing, typically under distinctly alkaline conditions (for example at pH values in the range 8.5-12), as can occur, in particular, in domestic laundry in the main wash cycle or/and in a subsequent fabric softening rinse. And so the invention furthermore provides the use of the polysiloxanes ($S_H$), optionally in the form of an aqueous composition ($W_{SH}$), for the softening treatment of washable fabrics, particularly in domestic laundry in the main wash cycle or/and in a subsequent fabric softening rinse. For this purpose, the polysiloxanes ($S_H$), optionally in the form of an aqueous composition ($W_{SH}$), may be combined with corresponding detergents and/or formulated alone or also in combination with otherwise conventional formulation components, to give corresponding softening agent compositions.

The invention consequently furthermore also provides detergents or softening agents for domestic laundry which are characterized by a content of ($S_H$), optionally in the form of an aqueous composition ($W_{SH}$). The content of ($S_H$) in these compositions may be in the same ranges as in known softening agents for this purpose, for example in the range from 0.1 to 20% by weight.

In the following examples, parts are parts by weight and percentages are percent by weight; the temperatures are indicated in degrees Celsius. The tridecanol polyglycol ethers are adducts of ethylene oxide onto tridecanol from the oxo synthesis. The dyes, optical brighteners and auxiliaries employed in the Application Examples are, with the exception of the products according to the invention, commercially available products; the dye and brightener concentrations are based on the commercially available form; "C.I." stands for "Colour Index"; "dH" stands for German degrees of water hardness.

Production of Alkylpolyglycol Glycidyl Ethers (H)

EXAMPLE 1

H(a). 4.60 parts of tin tetrachloride, anhydrous, are added at 80° C. to 432.60 parts of tridecanol poly-9.5-glycol ether. 64.8 parts of epichlorohydrin are then added dropwise over the course of about 60 minutes at 80° C., and reaction is allowed to continue for 60 minutes at 80° C. After evacuating to a residual pressure of about 40 mbar and cooling to 30° C. under reduced pressure, the vacuum is released with nitrogen, and 43.58 parts of potassium hydroxide, powder (content at least 85%), are added, during which the temperature rises from about 30 to 45° C. The mixture is then heated to 50° C. and at the same time re-evacuation to a residual pressure of 40 mbar is carried out in order to remove the water of reaction. After 60 minutes at 50° C. and 40 mbar, the vacuum is released with nitrogen, and the entire reaction material is filtered under reduced pressure. The filtrate (about 435.00 parts) has an epoxide equivalent weight of about 780 and is salt-free. The epoxide equivalent weight is the weight which is necessary to be able to titrate one epoxide group (or glycidyl group).

EXAMPLE 2

H(b). 2.50 parts of boron trifluoride ethyl etherate and 5.00 parts of tin tetrachloride, anhydrous, are added at 80° C. to 546.50 parts of tridecanol poly-12.0-glycol ether. 69.50 parts of epichlorohydrin are then added dropwise over the course of about 45 minutes at 80° C., and reaction is allowed to continue for 60 minutes at 80° C. After evacuating to a residual pressure of about 40 mbar and cooling to 30° C. under reduced pressure, the vacuum is released with nitrogen, and 45.70 parts of potassium hydroxide, powder (content at least 85%), are added, during which the temperature rises to about 45° C. The mixture is then heated to 50° C., allowed to react at 50° C. for a further 60 minutes, and the temperature is maintained for 60 minutes under a residual pressure of 30 mbar. The mixture is subsequently filtered at 50° C. under reduced pressure. The filtrate (about 520.00 parts) has an epoxide equivalent weight of about 950 and is salt-free.

Production of Amino-Modified Siloxanes (S)

EXAMPLE 3

S(a). 0.95 part of tetrabutylammonium hydroxide (40% methanolic solution) is added to 951.76 parts of octamethylcyclotetrasiloxane and 38.31 parts of [N-(2-aminoethyl)-3- aminopropyl]methyldimethoxysilane, and the mixture is heated to 70° C. over the course of 90 minutes under a gentle stream of nitrogen. After 2 hours at 70° C., evacuation is carried out to a residual pressure of 50 mbar and subsequently the mixture is heated to 110° C. at a constant residual pressure. After one hour at 110° C. and 50 mbar, the mixture is cooled to room temperature under reduced pressure. In total, about 25.0 parts of unreacted octamethylcyclotetrasiloxane have distilled and about 965.00 parts of amino-modified polydimethylsiloxane S(a) having an amine number of about 0.385 are obtained.

EXAMPLE 4

S(b). The procedure is as for the production of S(a), but 1600.00 parts of octamethylcyclotetrasiloxane are reacted with 93.00 parts of [N-(2-aminoethyl)-3-aminopropyl]methyldimethoxysilane and with 4.80 parts of tetrabutylammonium hydroxide (40% methanolic solution). About 1646.6 parts of amino-modified polydimethylsiloxane S(b) having an amine number of about 0.55 are obtained.

Production of the Substituted, Amino-Modified Siloxanes ($S_H$)

EXAMPLE 5

$S_H(aa)(1)$. 193.00 parts of S(a) are mixed with 87.00 parts of alkylpolyglycol glycidyl ether H(a) with stirring and under nitrogen, and the mixture is heated to 150° C. After 8 hours at 150° C., epoxide groups can no longer be titrated. The reaction product is cooled and discharged. 280.00 parts of silicone oil $S_H(aa)(1)$ are obtained.

EXAMPLE 6

$S_H(aa)(2)$. The procedure is as for $S_H(aa)(1)$, but 58.00 parts of alkylpolyglycol glycidyl ether H(a) are employed instead of 87.00 parts. 251.00 parts of silicone oil $S_H(aa)(2)$ are obtained.

EXAMPLE 7

$S_H(ba)(1)$. The procedure is as for $S_H(aa)(1)$, but 548.00 parts of S(b) and 235.00 parts of alkylpolyglycol glycidyl ether H(a) are employed. 783.00 parts of silicone oil $S_H(ba)(1)$ are obtained.

EXAMPLE 8

$S_H(ba)(2)$. The procedure is as for $S_H(aa)(1)$, but 548.00 parts of S(b) and 353.00 parts of alkylpolyglycol glycidyl ether H(a) are employed. 901.00 parts of silicone oil $S_H(ba)(2)$ are obtained.

EXAMPLE 9

$S_H(bb)(1)$. The procedure is as for $S_H(aa)(1)$, but 548.00 parts of S(b) are reacted with 430.00 parts of alkylpolyglycol glycidyl ether H(b). 978.00 parts of silicone oil $S_H(bb)(1)$ are obtained.

EXAMPLE 10

$S_H(bb)(2)$. The procedure is as for $S_H(aa)(1)$, but 548.00 parts of S(b) are reacted with 286.00 parts of alkylpolyglycol glycidyl ether H(b). 834.00 parts of silicone oil $S_H(bb)(2)$ are obtained.

Production of Aqueous Compositions ($W_{SH}$)

EXAMPLE 11

W1. 280.00 parts of silicone oil $S_H(aa)(1)$ are mixed at room temperature with 28.00 parts of tridecanol poly-9.5-glycol ether and 14 parts of water. 322.00 parts of Product W1 are obtained in the form of a transparent, viscous liquid which can readily be further diluted with water and which has a pH of about 9.0.

EXAMPLE 12

W2. 255.00 parts of silicone oil $S_H(aa)(2)$ are mixed with 40.00 parts of tridecanol poly-9.5-glycol ether at room temperature. A total of 700.00 parts of water in three portions are then stirred in, and subsequently 5.00 parts of glacial acetic acid are also added. 1000.00 parts of silicone microemulsion W2 are obtained.

EXAMPLE 13

W3. 160.00 parts of silicone oil $S_H(ba)(1)$ are stirred with 16 parts of tridecanol poly-6.5-glycol ether. 3.20 parts of acetic anhydride are subsequently added. After a reaction time of 15 minutes, 361.00 parts of water are added with stirring. 540.20 parts of silicone microemulsion W3 are obtained.

EXAMPLE 14

W4. 295.00 parts of silicone oil $S_H(ba)(2)$ are stirred with 666.00 parts of water, 9.00 parts of glacial acetic acid and 30.00 parts of tridecanol poly-12-glycol ether. 1000.00 parts of silicone microemulsion W4 are obtained.

EXAMPLE 15

W5. 307.00 parts of silicone oil $S_H(bb)(2)$ are stirred with 686.00 parts of water and 7.00 parts of glacial acetic acid. 1000.00 parts of silicone microemulsion W5 are obtained.

EXAMPLE 16

W6. 307.00 parts of silicone oil $S_H(bb)(2)$ are reacted with 6.00 parts of acetic acid anhydride at room temperature and subsequently stirred with 687.00 parts of water. 1000.00 parts of silicone microemulsion W6 are obtained.

EXAMPLE 17

W7. 110.00 parts of silicone oil $S_H(bb)(1)$ are stirred with 3.50 parts of glacial acetic acid and 15.00 parts of tridecanol poly-9.5-glycol ether and 199.50 parts of water. 328.00 parts of silicone microemulsion W7 are obtained.

APPLICATION EXAMPLES

Application Example A 1 kg of the substrate to be finished (textile goods, cotton single jersey, pre-dyed with 2.40% of C.I. Reactive Blue 193, 1.50% of C.I. Reactive Red 147 and 0.30% of C.I. Reactive Yellow 125) is treated with 30 g/l of finishing agent (products W2 to W7) at 40° C. and a liquor-to-goods ratio of 8:1 in a Mathis (Switzerland) laboratory jet. The liquor circulation is about 15.0 l/minute and the treatment time is 20 minutes. The water has a hardness of 110 dH (in accordance with DIN 57905) and a pH of about 6. After the treatment, the substrate is spun and dried in air. No deposits or smeary precipitations occur during the treatment. No spots are detectable on the textile goods. After the liquor has been let out, no residues can be observed in the machine. All products (W2 to W7) are shear-stable and yield a distinct improvement in the handle of the treated textile goods (compared with the goods treated correspondingly without silicone microemulsion).

Application Example B

Machine: THIES-Jet R95, 3 chambers;
Substrate: 220 kg of polyester/cotton (50:50) tricot, pale blue (0.20% C.I. Reactive Blue 19 and 0.13% C.I. Reactive Blue 21 and 0.015% C.I. Disperse Blue 56 and 1.020% C.I. Disperse Blue 87);
Liquor: 2200 l (liquor-to-goods ratio 10:1);
Goods speed: 150 m/min;
Temperature: 40° C.;
Product: 3% of W4;
Time: 20 minutes;
pH: 5.5 set using acetic acid.
Procedure: The product is pre-diluted in 100 l of water and metered in over the course of 5 minutes. No residues, deposits or spots form. The goods appearance and the soft handle of the dry goods are flaw-free.

Analogously to W4 also W2, W3, W5, W6 and W7 are employed. In addition to the excellent goods appearance and soft handle, the textiles treated with W4 and W7 are very hydrophilic.

Application Example C

Starting from W1, a microemulsion W1' is produced as follows:
694.0 parts of demineralized water are pre-set. 300.0 parts of W1 are then added with stirring. After 10 minutes, 6.00 parts of glacial acetic acid are added. A pumpable aqueous microemulsion is obtained (product W1').

A cotton cretonne, pre-brightened with 0.4% of C.I. Fluorescent Brightener 380 (in liquid form), is padded with an aqueous liquor containing 30 g/l of W1' at room temperature to a 75% pick-up (based on the dry weight of the substrate). The padded material is subsequently dried at 140° C. for 60 seconds. The finished goods have an excellent soft handle, are hydrophilic and, compared with a blind test, exhibit no impairment in the whiteness.

Application Example D

Polyester tricot, Tersuisse, dyed with 3% of a black disperse dye mixture of C.I. Disperse Blue 291:1, C.I. Disperse Violet 93:1, C.I. Disperse Red 54, C.I. Disperse Orange 25 and C.I. Disperse Orange 30, is padded with an aqueous liquor containing 30 g/l of W2 at room temperature to a 95% pick-up (based on the dry weight of the substrate). The padded material is subsequently dried at 140° C. for 120 seconds. The finished goods have an excellent soft handle. During the application, the disperse dye does not tend towards thermomigration.

The invention claimed is:

1. A substituted aminopolyorganosiloxane ($S_H$) containing amino groups bonded to silicon atoms of the polysiloxane skeleton via alkylene bridges or mono- or oligo-(alkyleneamino)-alkylene bridges, wherein the amino groups occurring in the aminopolyorganosiloxane are partially substituted with a radical of the formula $$T\text{—}CH_2\text{—}CHOH\text{—}OH_2 \qquad (\epsilon),$$

wherein

T is a radical of a surfactant monoalcohol polyglycol ether having an emulsifier character, in an average ratio of at least 1.5 radicals of the formula ($\epsilon$) per Si-bonded aminoalkyl group or amino-mono- or -oligo-(alkyleneamino)-alkyl group and the remaining part of the amino groups are at least in part acylated to amide groups, or are at least in part alkylated, benzylated, or a combination thereof, or are at least in part protonated.

2. A substituted aminopolyorganosiloxane ($S_H$) according to claim 1, containing substituted amino groups bonded to silicon atoms of a polysiloxane skeleton via alkylene bridges or mono- or oligo-(alkyleneamino)-alkylene bridges, wherein the amino groups occurring in an amino-polyorganosiloxane (S) are substituted at least in part with a radical of the formula ($\beta$),

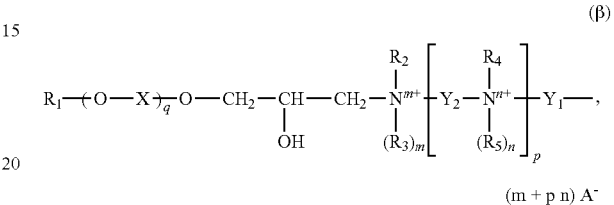

$$(m + p\,n)\,A^-$$

wherein $R_1$ is a hydrocarbon radical having from 8 to 24 carbon atoms;

X is $C_{2\text{-}4}$-alkylene;

q is from 4 to 50, with the proviso that at least 50% of the q alkylene groups X are ethylene;

m is 0 or 1, n is from 0 to 1, $\epsilon'$ is a radical of the formula

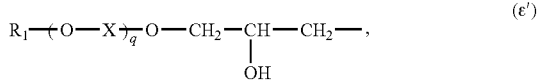

$R_2$ is hydrogen, $C_{1\text{-}2}$-alkyl, benzyl, or a radical of the formula ($\epsilon'$) or, if m=0, also a radical of the formula $R_6$—CO—, $R_3$ is hydrogen or, if $R_2$ stands for $C_{1\text{-}2}$-alkyl, benzyl or a radical of the formula ($\epsilon'$), also $C_{1\text{-}2}$-alkyl or benzyl, $R_4$ is hydrogen, $C_{1\text{-}2}$-alkyl, benzyl, a radical of the formula ($\epsilon'$) or, if n 0, also a radical of the formula $R_6$—CO—, $R_5$ is hydrogen or, if $R_4$ stands for $C_{1\text{-}2}$-alkyl, benzyl or a radical of the formula ($\epsilon'$), also $C_{1\text{-}2}$-alkyl or benzyl, $R_6$ is $C_{1\text{-}3}$-alkyl $Y_1$ is 1,2- or 1,3-propylene or 2-methyl-1,3-propylene, $Y_2$ is ethylene or propylene p is 0, 1 or 2, and $A^-$ is a monovalent anion, with the provisos that at least 50% of the q alkylene groups X are ethylene and the radicals of the formula ($\beta$) contain on average at least 1.5 radicals of the formula ($\epsilon'$) per radical of the formula ($\beta$).

3. The substituted aminopolyorganosiloxane ($S_H$) according to claim 1 comprising repeating units of formulae

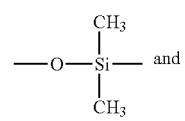

-continued

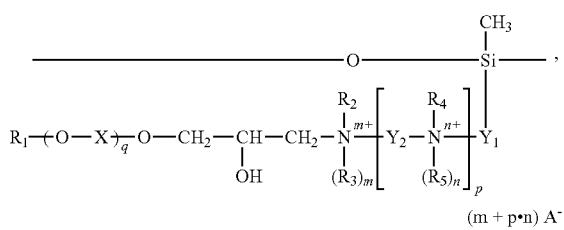
(γ7)

(m + p·n) A⁻ wherein
m is 0 or 1,
n is from 0 to 1,
p is 0, 1 or 2,
q is from 4 to 50,
X is $C_{2-4}$-alkylene,
$Y_1$ is 1,2- or 1,3-propylene or 2-methyl-1,3-propylene,
$Y_2$ is ethylene or propylene
$R_1$ is a hydrocarbon radical having from 8 to 24 carbon atoms,
$R_2$ is hydrogen, $C_{1-2}$-alkyl, benzyl, or a radical of the formula

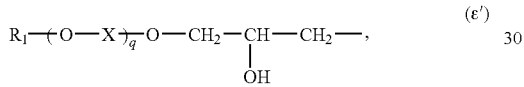
(ε')

or, if m=0, also a radical of the formula $R_6$—CO—,
$R_3$ is hydrogen or, if $R_2$ stands for $C_{1-2}$-alkyl, benzyl or a radical of the formula (ε'), also $C_{1-2}$-alkyl or benzyl,
$R_4$ is hydrogen, $C_{1-2}$-alkyl, benzyl, a radical of the formula (ε') or, if n=0, also a radical of the formula $R_6$—CO—,
$R_5$ is hydrogen or, if $R_4$ stands for $C_{1-2}$-alkyl, benzyl or a radical of the formula (ε'), also $C_{1-2}$-alkyl or benzyl,
$R_6$ is $C_{1-3}$-alkyl
and A⁻ is a monovalent anion,
with the provisos that
at least 50% of the q alkylene groups X are ethylene,
and terminal, oxygen-bonded silyl groups of formula

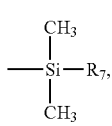
(γ4)

wherein $R_7$ is methyl, hydroxy, methoxy or ethoxy, and/or

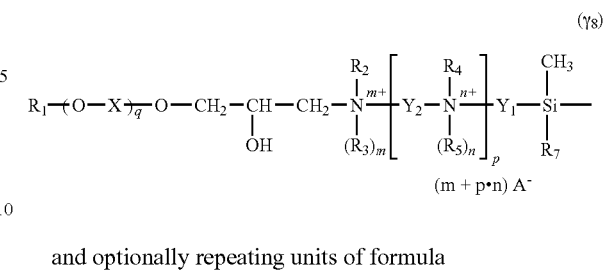
(γ8)

(m + p·n) A⁻ and optionally repeating units of formula

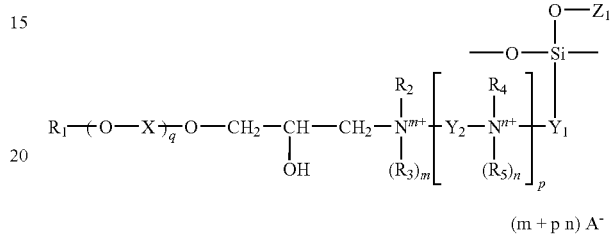
(γ9)

(m + p n) A⁻ wherein
$Z_1$ is an Si-bonded (poly)siloxane or silyl radical which contains one or more of the groups of the formula (γ2), (γ2), (γ7) and/or (γ8) and optionally further Si branchings of this type.

4. The substituted aminopolyorganosiloxane ($S_H$) according to claim 1 wherein the radical of formula (ε) is a radical of the average formula

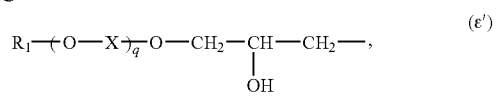
(ε')

wherein
$R_1$ is a hydrocarbon radical having from 8 to 24 carbon atoms,
X is $C_{2-4}$-alkylene
and q is from 4 to 50,
with the proviso that at least 50% of the q alkylene groups X are ethylene,
and the amine number of the corresponding unsubstituted aminopoly-organosiloxane (S) is in the range of 0.1 to 2.

5. The substituted aminopolyorganosiloxane ($S_H$) according to claim 4, wherein X is ethylene, q is 4-18, and the amine number of the corresponding unsubstituted aminopolyorganosiloxane (S) is in the range of 0.15 to 1.

6. The substituted aminopolyorganosiloxane ($S_H$) according to claim 2, wherein the groups of formula (β) are of the following formula

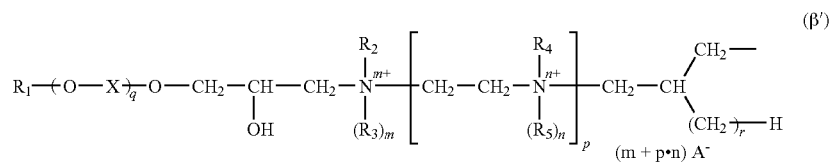
(β')

(m + p·n) A⁻ in which at least one of $R_2$ and $R_4$ is a radical of the formula ($\epsilon'$) and r is 0 or 1.

7. The substituted aminopolyorganosiloxane ($S_H$) according to claim 6, wherein the groups of formula ($\beta'$) are of the following formula

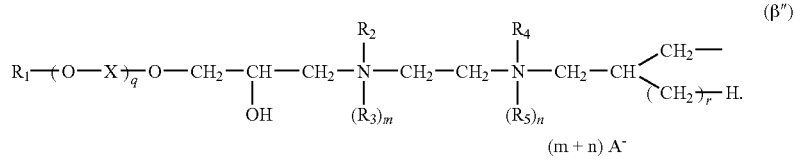

8. The substituted aminopolyorganosiloxane ($S_H$) according to claim 7, wherein the groups of formula ($\beta''$) are selected from non-quaternized groups of the following formula

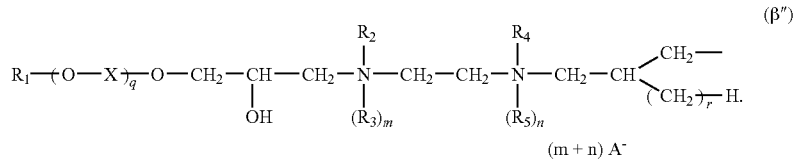

and their protonated derivatives.

9. A substituted aminopolyorganosiloxane ($S_H$) according to claim 1 wherein the radicals of formula ($\epsilon$) correspond to formula ($\epsilon'$)

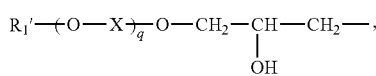

wherein
$R_1'$ is a hydrocarbon radical having from 9 to 18 carbon atoms,
X is $C_{2-4}$-alkylene
and q is from 4 to 50,
with the proviso that at least 50% of the q alkylene groups X are ethylene.

10. A process for the production of a substituted aminopolyorganosiloxane ($S_H$) according to claim 9, comprising the steps of reacting an aminopolyorganosiloxane (S) containing primary and/or secondary amino groups bonded to silicon atoms of the polysiloxane skeleton via alkylene bridges or mono- or oligo-(alkyleneamino)-alkylene bridges with at least one alcohol polyglycol ether monoglycidyl ether (H) of formula (I'')

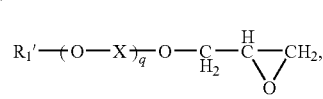

wherein $R_1'$, X and q are defined above,
and subsequently acylating the remaining amino groups, at least in part, to amide groups, or alkylating and/or benzylating, or a combination thereof, at least in part, the remaining amino groups, or protonating, at least in part, the remaining basic amino groups.

11. A process according to claim 10, wherein the amine number of (S) is in the range of 0.05 to 3.

12. A process according to claim 10, wherein the amine number of (S) is in the range of 0.1 to 2.

13. A process according to claim 10, wherein the amine number of (S) is in the range of 0.15 to 1.

14. A process according to claim 10, wherein the polymer (S) has a viscosity in the range 500-30,000 cP (Brookfield rotational viscometer RV, spindle No. 5, 20° C.) and an average molecular weight $\overline{M}_w$ in the range of 1500 to 300,000.

15. An aqueous composition ($W_{SH}$) consisting of ($S_H$) according to claim 9 and water.

16. An aqueous composition ($W_{SH}$) according to claim 15, consisting of ($S_H$), water and at least one additive selected from the group consisting of: non-ionogenic emulsifier (E) and a formulation additive (F) selected from the group consisting of:
($F_1$) agents for influencing the liquid form of the aqueous composition, selected from ($F_1'$) hydrotropes and ($F_{1''}$) rheology assistants,
($F_2$) agents for protection against the damaging action of microorganisms
($F_3$) acids and/or bases for pH adjustment
and combinations of two or more thereof.

17. An aqueous composition ($W_{SH}$) of at least one substituted aminopolyorganosiloxane ($S_H$) according to claim 1, consisting of ($S_H$), water and at least one formulation additive (F) selected from the group consisting of:
($F_1$) agents for influencing the liquid form of the aqueous composition, selected from ($F_1'$) hydrotropes and ($F_{1''}$) rheology assistants,
($F_2$) agents for protection against the damaging action of microorganisms
($F_3$) acids and/or bases for pH adjustment
and combinations of two or more thereof.

18. An aqueous composition ($W_{SH}$) according to claim 17 further containing at least one non-ionogenic emulsifier (E).

19. An aqueous composition ($W_{SH}$) according to claim 16, in which ($S_H$) is present in a concentration of 15 to 95% referred to ($W_{SH}$).

20. An aqueous composition ($W_{SH}$) of at least one substituted aminopolyorganosiloxane ($S_H$), according to claim 1.

21. An aqueous composition ($W_{SH}$) of at least one substituted aminopolyorganosiloxane ($S_H$), according to claim 1, consisting of ($S_H$) and water.

22. An aqueous composition ($W_{SH}$) of at least one substituted aminopolyorganosiloxane ($S_H$) according to claim 1, consisting of ($S_H$), water and at least one additive selected from the group consisting of: non-ionogenic emulsifier (E) and a formulation additive (F) selected from the group consisting of:
($F_1$) agents for influencing the liquid form of the aqueous composition,
($F_2$) agents for protection against the damaging action of microorganisms
($F_3$) acids and/or bases for pH adjustment and combinations thereof.

23. An aqueous composition ($W_{SH}$) according to claim 20, wherein the substituted aminopolyorganosiloxane ($S_H$) contains repeat units of the formulae

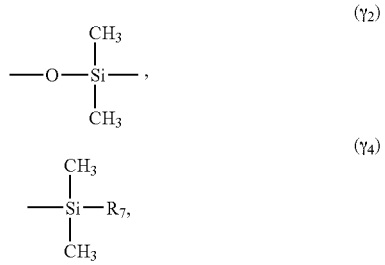

($\gamma_2$)

($\gamma_4$)

wherein $R_7$ is methyl, hydroxy, methoxy or ethoxy,

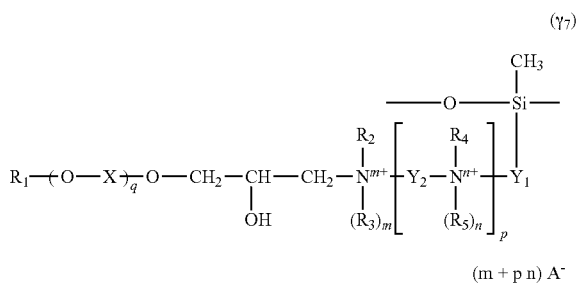

($\gamma_7$)

and/or ($\gamma_8$)

wherein $R_1$, $R_2$, $R_3$, $R_4$, $R_5$, X, $Y_1$, $Y_2$, $A^-$, m, n, p, and q are defined above, with the proviso that on average at least 1.5 radicals of the formula ($\epsilon'$)

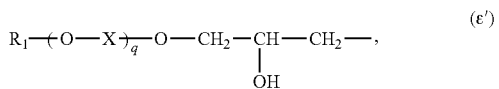

($\epsilon'$)

are present in the molecule per each of the Si-bonded aminoalkyl or/and amino-mono- or -oligo-(alkyleneamino)-alkyl groups of formula ($\beta$) present in total.

24. An aqueous composition according to claim 23 wherein up to p+2 radicals of formula ($\epsilon'$) are present in the molecule per each of the Si-bonded aminoalkyl or/and amino-mono- or -oligo-(alkyleneamino)-alkyl groups of formula ($\beta$) present in total.

25. An aqueous composition ($W_{SH}$) of at least one substituted aminopolyorganosiloxane ($S_H$), consisting of the at least one substituted amino-polyorganosiloxane ($S_H$), according to claim 2 and water, and at least one additive selected from the group consisting of: non-ionogenic emulsifier (E) and a formulation additive (F) selected from the group consisting of:
($F_1$) agents for influencing the liquid form of the aqueous composition,
($F_2$) agents for protection against the damaging action of microorganisms
($F_3$) acids and/or bases for pH adjustment
and combinations thereof.

26. An aqueous composition ($W_{SH}$), comprising the substituted amino-polyorganosiloxane ($S_H$) according to claim 5.

27. A finishing composition for the softening finishing of textile material, comprising an aqueous composition ($W_{SH}$) according to claim 20.

28. A finishing agent with softener properties comprising the aminopolyorganosiloxane ($S_H$) according to claim 1.

29. An aqueous composition ($W_{SH}$) according to claim 20, wherein the substituted aminopolyorganosiloxane ($S_H$) contains repeat units of the formula ($\gamma_9$),

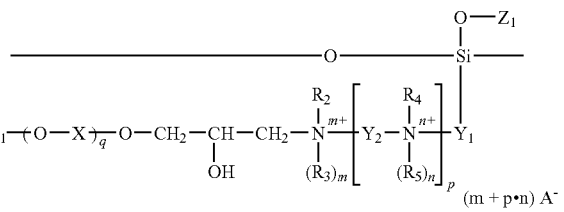

($\gamma_9$)

in which $Z_1$ is a Si-bonded (poly)siloxane or silyl radical which contains one or more of the groups of the formula ($\gamma_2$), ($\gamma_4$), ($\gamma_7$) and/or ($\gamma_8$) and optionally further Si branchings of this type,
wherein $R_1$, $R_2$, $R_3$, $R_4$, $R_5$, X, $Y_2$, $A^-$, m, n, p and q, and formulae ($\gamma_2$), ($\gamma_4$), ($\gamma_7$) and ($\gamma_8$) are defined above
with the proviso that on average at least 1.5 radicals of the formula ($\epsilon'$) are present in the molecule per each of the Si-bonded aminoalkyl or/and amino-mono- or -oligo-(alkyleneamino)-alkyl groups of formula ($\beta$) present in total.

30. An aqueous composition ($W_{SH}$) of at least one substituted aminopolyorganosiloxane ($S_H$) according to claim 2, wherein ($W_{SH}$) consists of 15 to 95% by weight of the at least one substituted aminopolyorganosiloxane ($S_H$).

31. A process for the production of a substituted aminopolyorganosiloxane ($S_H$) according to claim 1, comprising the steps of reacting an aminopolyorganosiloxane (S) containing primary and/or secondary amino groups bonded to silicon atoms of the polysiloxane skeleton via alkylene bridges or mono- or oligo-(alkyleneamino)-alkylene bridges with at least one alcohol polyglycol ether monoglycidyl ether (H) and subsequently acylating the remaining amino groups, at least in part, to amide groups, or alkylating, benzylating, or a combination thereof, at least in part, the remaining amino groups, or protonating, at least in part, the remaining basic amino groups.

32. A process according to claim 31, wherein the amine number of the aminopolyorganosiloxanes (S) is in the range of 0.05 to 3.

33. A process according to claim 31, wherein the primary amino groups, and any secondary amino groups present in the

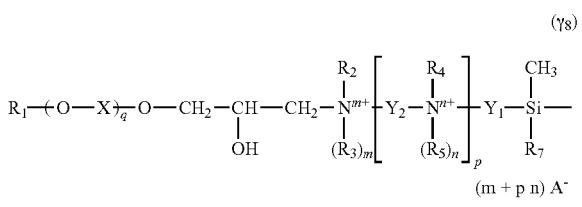

aminopolyorganosiloxane (S), are constituents of aminoalkyl groups or amino-mono- or -oligo-(alkyleneamino)-alkyl groups of the formula

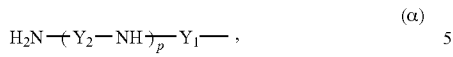 (α)

wherein $Y_1$ is 1,2- or 1,3-propylene or 2-methyl-1,3-propylene,
$Y_2$ is ethylene or propylene
and p is 0, 1 or 2,
bonded to silicon atoms of the polysiloxane skeleton.

34. A process according to claim 33, wherein the aminopolyorganosiloxanes (S) comprise repeating units of formulae

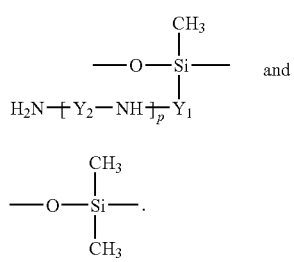

and terminal, oxygen-bonded silyl groups of formula

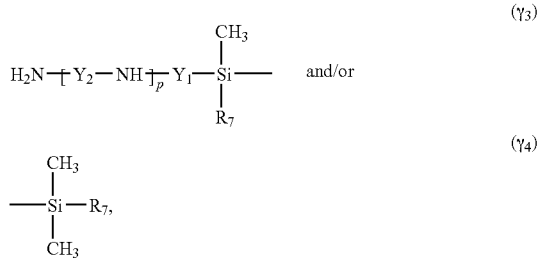

in which $R_7$ is methyl, hydroxy, methoxy or ethoxy, and optionally units of formula

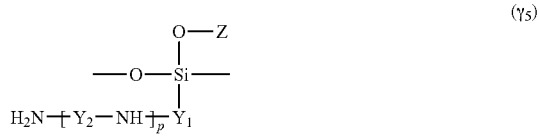

wherein Z is an Si-bonded (poly)siloxane or silyl radical containing one or more of the groups of the formula ($\gamma_1$), ($\gamma_2$), ($\gamma_3$) and/or ($\gamma_4$).

35. A process according to claim 34, wherein the aminopolyorganosiloxane (S) corresponds to the following average comprehensive formula (III):

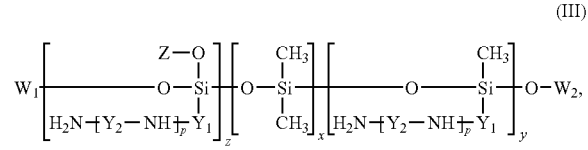 (III)

wherein $W_1$ and $W_2$ each are a group of the formula ($\gamma_3$) or ($\gamma_4$), the molecule possesses at least one group of the formula (α) or respectively ($\gamma_1$), ($\gamma_3$) and/or ($\gamma_5$), and the indices x, y and z are selected in such a way that the polymer has an amine number of in the range from 0.05 to 3.

36. A process according to claim 35, wherein the indices x, y and z are selected in such a way that the polymer has a viscosity in the range 500-30,000 cP (Brookfield rotational viscometer RV, spindle No. 5, 20° C.) and an average molecular weight $\overline{M}_w$ in the range of 1500 to 300,000.

37. A process for the finishing of a textile fibrous substrate, comprising the steps of applying an aminopolyorganosiloxane ($S_H$) according to claim 1, to the textile fibrous substrate in an aqueous medium and subsequently drying the textile fibrous substrate.

38. A process according to claim 37, for the softening of washable fabrics.

39. A process according to claim 37, wherein the applying step is carried out by an impregnation or exhaust process.

40. A process according to claim 37, for the finishing of textile material, wherein the applying step is an exhaust process carried out in a jet-dyeing machine.

41. A process according to claim 37, for the finishing of textile material wherein the applying step is by an impregnation process wherein the impregnation is carried out in combination with the application of a synthetic-resin finish.

42. A process according to claim 38, for the softening treatment of textile material in domestic laundry, wherein the treatment is carried out in the main wash cycle, a subsequent softening rinsing cycle or both.

43. A method for finishing a textile substrate comprising the step of applying a finishing agent with softener properties, wherein the finishing agent is an aqueous composition ($W_{SH}$) according to claim 20, to the textile substrate.

44. Method of use of substituted aminopolyorganosiloxanes ($S_H$) which are defined as in claim 1, for the finishing of a textile fibrous substrate, wherein softener ($S_H$) is applied to the textile fibrous substrate from an aqueous medium and the treated textile fibrous substrate is dried.

45. A process for the finishing of a textile fibrous substrate, comprising the steps of applying an aqueous composition ($W_{SH}$) according to claim 20, to the textile fibrous substrate in an aqueous medium and subsequently drying the textile fibrous substrate.

46. A detergent or softening agent composition for domestic laundry containing a polysiloxane-based softener, wherein said polysiloxane-based softener is at least one substituted aminopolyorganosiloxane ($S_H$) according to claim 1

* * * * *